US010623742B2

(12) United States Patent
Lou et al.

(10) Patent No.: US 10,623,742 B2
(45) Date of Patent: *Apr. 14, 2020

(54) METHOD OF DETERMINING BINARY CODEWORDS FOR TRANSFORM COEFFICIENTS

(71) Applicant: GOOGLE TECHNOLOGY HOLDINGS LLC, Mountain View, CA (US)

(72) Inventors: Jian Lou, San Diego, CA (US); Xue Fang, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,613

(22) Filed: Apr. 30, 2019

(65) Prior Publication Data

US 2019/0260995 A1 Aug. 22, 2019

Related U.S. Application Data

(63) Continuation of application No. 13/745,508, filed on Jan. 18, 2013, now Pat. No. 10,284,851.

(Continued)

(51) Int. Cl.
*H04N 11/02* (2006.01)
*H04N 19/13* (2014.01)
(Continued)

(52) U.S. Cl.
CPC ........... *H04N 19/13* (2014.11); *H04N 19/124* (2014.11); *H04N 19/18* (2014.11); *H04N 19/91* (2014.11)

(58) Field of Classification Search
CPC ...... H04N 19/13; H04N 19/124; H04N 19/18; H04N 19/91

(Continued)

(56) References Cited

U.S. PATENT DOCUMENTS 6,014,095 A 1/2000 Yokoyama
7,158,684 B2 1/2007 Cheung et al.
(Continued)

FOREIGN PATENT DOCUMENTS

WO 2008153270 A1 12/2008
WO 2011142817 A1 11/2011
WO 2012095488 A2 7/2012

OTHER PUBLICATIONS

Aaron Kiely: "Selecting the Golomb Parameter in Rice Coding", IPN Progress Report,, vol. 42-159, Nov. 15, 2004, all pages.
(Continued)

*Primary Examiner* — Jayanti K Patel
*Assistant Examiner* — Richard B Carter
(74) *Attorney, Agent, or Firm* — Young Basile Hanlon & MacFarlane, P.C.

(57) ABSTRACT

Generating a reconstructed may include reading a binary codeword corresponding to a transform coefficient for a sub-block of a transform unit, the transform coefficient having a quantized value, identifying a value of a parameter variable as zero in response to a determination that the transform coefficient is a first transform coefficient for the sub-block, and otherwise as an updated parameter variable value, converting the binary codeword into a symbol based on the value of the parameter variable, determining the absolute value of the transform coefficient corresponding to the symbol, wherein the quantized value for the transform coefficient is equal to or greater than a threshold value, by adding the threshold value to the symbol, including the transform coefficient in the sub-block of the transform unit, and generating a portion of the reconstructed frame based on the transform unit.

14 Claims, 17 Drawing Sheets

Related U.S. Application Data

(60) Provisional application No. 61/589,303, filed on Jan. 21, 2012.

(51) Int. Cl.
*H04N 19/124* (2014.01)
*H04N 19/91* (2014.01)
*H04N 19/18* (2014.01)

(58) Field of Classification Search
USPC ............... 375/240, 240.02–240.03; 382/251
See application file for complete search history.

(56) References Cited

U.S. PATENT DOCUMENTS

| | | | |
|---|---|---|---|
| 9,641,835 B2 | 5/2017 | Lou et al. | |
| 10,284,851 B2* | 5/2019 | Lou ..................... | H04N 19/13 |
| 2002/0085630 A1* | 7/2002 | Kleihorst ............. | H04N 19/51 |
| | | | 375/240 |
| 2005/0123207 A1 | 6/2005 | Marpe et al. | |
| 2006/0103556 A1 | 5/2006 | Malvar | |
| 2007/0154090 A1 | 7/2007 | Howard | |
| 2008/0013633 A1 | 1/2008 | Ye et al. | |
| 2008/0231483 A1 | 9/2008 | He et al. | |
| 2008/0266151 A1 | 10/2008 | Sankaran | |
| 2008/0267513 A1 | 10/2008 | Sankaran | |
| 2008/0273810 A1* | 11/2008 | Subramania ........ | H04N 19/176 |
| | | | 382/251 |
| 2008/0310503 A1 | 12/2008 | Lee et al. | |
| 2009/0175332 A1 | 7/2009 | Karczewicz et al. | |
| 2009/0232204 A1* | 9/2009 | Lee ..................... | H04N 19/176 |
| | | | 375/240.02 |
| 2011/0206289 A1 | 8/2011 | Dikbas et al. | |
| 2012/0128067 A1 | 5/2012 | Liu et al. | |
| 2012/0230402 A1 | 9/2012 | Auyeung et al. | |
| 2012/0230417 A1 | 9/2012 | Rojals et al. | |
| 2012/0300839 A1 | 11/2012 | Sze et al. | |
| 2012/0307894 A1 | 12/2012 | Chien et al. | |
| 2013/0003840 A1 | 1/2013 | Gao et al. | |
| 2013/0003858 A1 | 1/2013 | Sze | |
| 2013/0016789 A1 | 1/2013 | Lou et al. | |
| 2013/0101046 A1 | 4/2013 | Korodi et al. | |
| 2013/0114685 A1 | 5/2013 | Kerofsky et al. | |
| 2013/0114693 A1* | 5/2013 | Gao ..................... | H04N 19/593 |
| | | | 375/240.03 |
| 2013/0114698 A1 | 5/2013 | Lou et al. | |
| 2013/0114738 A1 | 5/2013 | Chien et al. | |
| 2013/0182758 A1 | 7/2013 | Seregin et al. | |
| 2013/0182773 A1 | 7/2013 | Seregin et al. | |
| 2013/0188683 A1 | 7/2013 | Kim et al. | |
| 2013/0188694 A1 | 7/2013 | Lou et al. | |
| 2013/0188698 A1 | 7/2013 | Chien et al. | |
| 2013/0188727 A1 | 7/2013 | Lou et al. | |
| 2013/0188729 A1 | 7/2013 | Lou et al. | |
| 2013/0188734 A1 | 7/2013 | Kim et al. | |
| 2013/0195182 A1 | 8/2013 | Kung et al. | |
| 2013/0195370 A1 | 8/2013 | Sasai et al. | |
| 2013/0202026 A1 | 8/2013 | Fang et al. | |
| 2013/0202029 A1 | 8/2013 | Lou et al. | |
| 2013/0230097 A1 | 9/2013 | Rojals et al. | |
| 2014/0056356 A1 | 2/2014 | Yu et al. | |

OTHER PUBLICATIONS

Auyeung, et al.; Context Reduction of SIGNIFICAncE Map Coding With CABAC; JCTVC-G1015; 7th Meeting: Geneva, CH, Nov. 21-30, 2011.

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.

Guo L. et al.: "CABAC Contexts Reduction for Last Position Coding", 8. JCT-VC Meeting; 99 MPEG Meeting; Feb. 1, 2012 Feb. 10, 2012; San Jose; (Joint Collaborative Team on Video Coding of ISO/IEC JTC1/SC29/WG11 and ITU-T-SG. 16); URL:http://wftp3.itu.int/av-arch/jctvc-site/,, No. JCTVC-H)537, Jan. 21, 2012, all pages.

Heising et al., "CABAC and ABT" Joint Video Team (JVT) of ISO/IEC MEPG & ITU-T VCEG (ISO/IEC JTC1/SC29/W1 and ITU-T SG16 Q.6) 4th Meeting: Klagenfurt, Austria; Jul. 22-26, 2002; 14 pages.

International Search Report and Written Opinion of the International Searching Authority for International Application No. PCT/US2012/046960 dated Feb. 25, 2013, 19 pages.

International Search Report and Written Opinion of the International Searching Authority for International Application No. PCT/US2012/064229 dated Feb. 4, 2014, 1220 pages.

International Search Report and Written Opinion of the International Searching Authority for International Application No. PCT/US2013/022306 dated Mar. 28, 2013, 14 pages.

International Search Report and Written Opinion of the International Searching Authority for International Application No. PCT/US2013/022312 dated 2013 Apr. 2013, 14 pages.

International Search Report, & Written Opinion of the International Searching Authority for International Application No. PCT/US2013/024654, dated May 7, 2013, 11 pages.

International Search Report, & Written Opinion of the International Searching Authority for International Application No. PCT/US2013/024786, dated May 21, 2013, 11 pages.

Kurcerin et al., "Improvements on CABAC" ITU-Telecommunications Standardization Sector; Study Group 16 Question 6; Video Coding Experts Group (VCEG) 14th Meeting: Santa Barbara, CA, USA; Sep. 24-27, 2001; 6 pages.

Lou J et al.: "On coeff_abs_level_minus3 coding", 7 JCT-VC Meeting; 98. MPEG Meeting; Nov. 21, 2011-Nov. 30. 2011; Geneva; (Joint Collaborative Team on Video Coding of ISO/IEC JTC1/SC29/WG11 and ITU-T SG.16); URL:http://wftp3.itu.int/av-arch/jctvc-site/,,No. JCTVC-G700, Nov. 9, 2011, all pages.

Malvar HS: "Adaptive run-length/Golomb-Rice encoding of quantized generalized Gaussian sources with unknown statistics," Proceddings, DCC 2006, Data Compression Conference, Mar. 28, 2006,-Mar. 30, 2006, all pages, IEEE Compt. Society Los Alamitos, CA USA.

Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.

Nguyen (Fraunhofer HHI)T: "CE:11 Coding of Transform Coefficient Levels with Golomb-Rice codes," Mar. 10, 2011, all pages.

Nguyen et al., "Proposed Cleanup for Transform Coefficient Coding," Joint Collaborative Team on Video Coding JCTVC-H0228, Feb. 1, 2012.

Nguyen T et al.: "Reduced-complexity entropy coding of transform coefficient levels using a combination of VLC and PIPE," 4. JCT-VC Meeting; 95. Mpeg Meeting; Jan. 20, 2011-Jan. 28, 2011; Daegu; (Joint Collaborative Team on Video Coding of ISO/IEC JTC1/SC29/WG11 and ITU-T SG16); URL: http://wftp3.itu.int/av-arch/jctvc-site/. No. JCTVC-D336, Jan. 16, 2011 all pages.

Nguyen, et al.; Multi-Level SIGNIFICAncE Maps for Large Transform Units; JCTVC-G644; 7th Meeting: Geneva, Nov. 21-30, 2011.

Nguyen, Tung et al.: "Reduced-complexity entropy coding of transform coefficient levels using truncated golomb-rice codes in video compression", Image Processing (ICIP), 2011 18th IEEE Internation CONFEREncE on, IEEE, Sep. 11, 2011, all pages.

Sole et al., "Unified scans for the significance map and coefficient level coding in high coding efficiency," Joint Collaborative Team on Video Coding, JCTVCF-288 Geneva, Jul. 8, 2011.

Sole, et al.; Non-CE11: Diagonal Sub-Block Scan for the Residual Coding; JCTVC-G323; 7th Meeting: Geneva, CH, Nov. 21-30, 2011.

Sze, "Reduction in contexts used for significant coeff_flag and coefficient level" Joint Collaborative Team on Video Coding (JCT-VC) of ITU-T S6 WB3 and ISO/IEC JTC1/SC29/W1; 6th Meeting: Torino, IT; Jul. 14-22, 2011; 4 pages.

(56) References Cited

OTHER PUBLICATIONS

Wiegand et al., "WD3: Working Draft 3 of High-Efficiency Video Coding," Mar. 29, 2011 JCTVC-E603, Mar. 29, 2011, all pages.
Wiegand, T. "Joint Committee Draft" Draft ISO/IEC 14496-10: 2002 ( E ); Joint Video Team (JVTC167) of ISO/IEC MGPG and ITU-T-VCEG; 3rd Meeting; Fairfax, Virginia, USA; May 6-10, 2002; 142 pages.
Wien, Mathias "Variable Block-Size Transforms for Hybrid Video Coding" Dissertation Der Rheinisch-Westfaelischen Technischen Hochschule Aachen; Aachen, Germany; Feb. 3, 2004; 184 pages.
Bross B et al: "High Efficiency Video Coding (HEVC) text specification draft 6", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H1003, Feb. 10, 2012 (Feb. 10, 2012), all pages.
Jin Heo et al.: "3DV.h: Modified truncated Golomb-Rice Code for 3DV-HTM", 100. MPEG Meeting; Apr. 30, 2012-May 4, 2012; Geneva; (Motion Picture Expeert Group or ISO/IEC JTC1/SC29/WG11),, No. m25005, Apr. 28, 2012, all pages.
Sole et al.: "Transform Coefficien tCoding in HEVC", IEE Transactions on Circuits and Systems for Video Technology, vol. 22, No. 12, Dec. 1, 2012, all pages, IEEE Service Center, Piscataway, NJ, US.
Bankoski et al. "Technical Overview of VP8, an Open Source Video Codec for the Web". Dated Jul. 11, 2011.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
VP6 Bitstream and Decoder Specification, Version 1.03, (On2 Technologies, Inc.), Dated Oct. 29, 2007.
Korean Office Action in related matter. KR1020147001166, dated Sep. 15, 2015.
Nguyen, Tung et al., Entropy coding of syntax elements related to block structures and transform coefficient levels in HEVC, Proceedings of SPIE, vol. 8499, Oct. 25, 2012, section 4 with figures 3-5.
International Search Report and Written Opinion of the International Searching Authority for International Application No. PCT/US2015/060825 dated Feb. 15, 2016, 14 pages.

\* cited by examiner

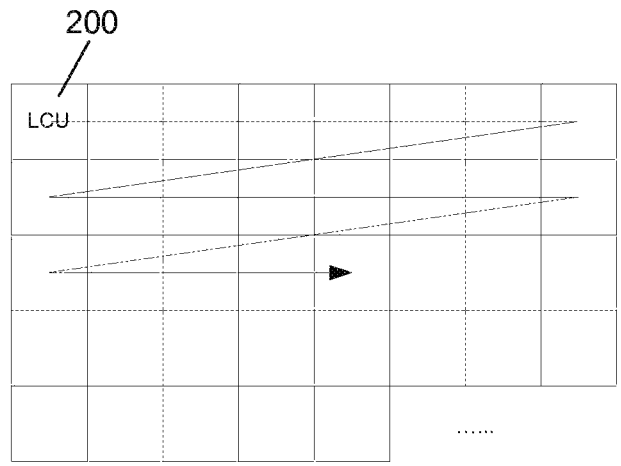
FIG. 2
Prior Art
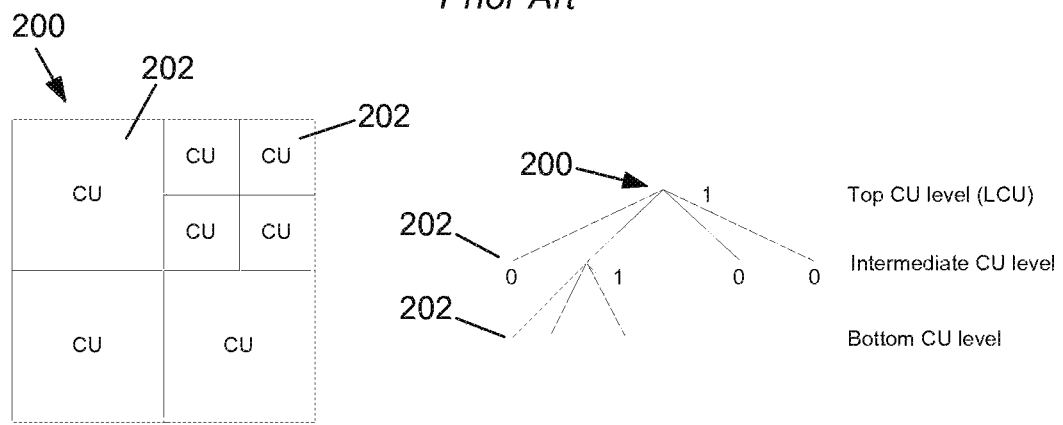
FIG. 3
Prior Art
FIG. 4
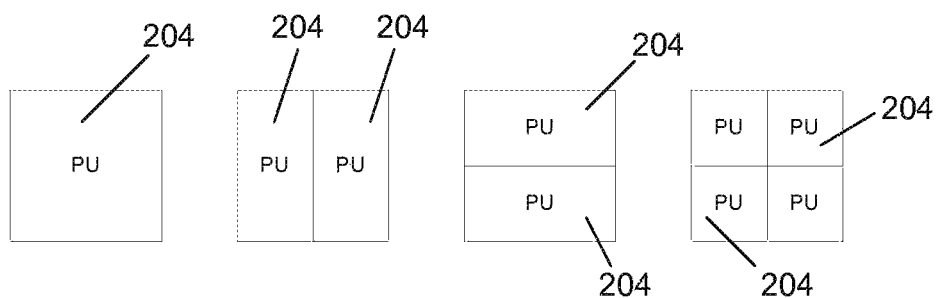
FIG. 5

Table 1

| cRiceParam | cTRMax |
|---|---|
| 0 | 7 |
| 1 | 20 |
| 2 | 42 |
| 3 | 70 |

226 →

| eRiceParam | 0 | | 1 | | 2 | | 3 | |
|---|---|---|---|---|---|---|---|---|
| Symbol | Codeword | Bits | Codeword | Bits | Codeword | Bits | Codeword | Bits |
| 0 | 0 | 1 | 00 | 2 | 000 | 3 | 0000 | 4 |
| 1 | 10 | 2 | 01 | 2 | 001 | 3 | 0001 | 4 |
| 2 | 110 | 3 | 100 | 3 | 010 | 3 | 0010 | 4 |
| 3 | 1110 | 4 | 101 | 3 | 011 | 3 | 0011 | 4 |
| 4 | 11110 | 5 | 1100 | 4 | 1000 | 4 | 0100 | 4 |
| 5 | 111110 | 6 | 1101 | 4 | 1001 | 4 | 0101 | 4 |
| 6 | 1111110 | 7 | 11100 | 5 | 1010 | 4 | 0110 | 4 |
| 7 | 11111110 | 8 | 11101 | 5 | 1011 | 4 | 0111 | 4 |
| 8 | 11111111,EG0 | 9 | 111100 | 6 | 11000 | 5 | 10000 | 5 |
| 9 | | | 111101 | 6 | 11001 | 5 | 10001 | 5 |
| 10 | | | 1111100 | 7 | 11010 | 5 | 10010 | 5 |
| 11 | | | 1111101 | 7 | 11011 | 5 | 10011 | 5 |
| 12 | | | 11111100 | 8 | 111000 | 6 | 10100 | 5 |
| 13 | | | 11111101 | 8 | 111001 | 6 | 10101 | 5 |
| 14 | | | 111111100 | 9 | 111010 | 6 | 10110 | 5 |
| 15 | | | 111111101 | 9 | 111011 | 6 | 10111 | 5 |
| 16 | | | 1111111100 | 10 | 1111000 | 7 | 110000 | 6 |
| 17 | | | 1111111101 | 10 | 1111001 | 7 | 110001 | 6 |
| 18 | | | 11111111100 | 11 | 1111010 | 7 | 110010 | 6 |
| 19 | | | 11111111101 | 11 | 1111011 | 7 | 110011 | 6 |
| 20 | | | 11111111110 | 11 | 11111000 | 8 | 110100 | 6 |
| 21 | | | 11111111111,EG0 | 12 | 11111001 | 8 | 110101 | 6 |
| 22 | | | | | 11111010 | 8 | 110110 | 6 |
| 23 | | | | | 11111011 | 8 | 110111 | 6 |
| 24 | | | | | 111111000 | 9 | 1110000 | 7 |
| 25 | | | | | 111111001 | 9 | 1110001 | 7 |
| 26 | | | | | 111111010 | 9 | 1110010 | 7 |
| 27 | | | | | 111111011 | 9 | 1110011 | 7 |
| 28 | | | | | 1111111000 | 10 | 1110100 | 7 |
| 29 | | | | | 1111111001 | 10 | 1110101 | 7 |
| 30 | | | | | 1111111010 | 10 | 1110110 | 7 |
| 31 | | | | | 1111111011 | 10 | 1110111 | 7 |
| 32 | | | | | 11111111000 | 11 | 11110000 | 8 |
| 33 | | | | | 11111111001 | 11 | 11110001 | 8 |
| 34 | | | | | 11111111010 | 11 | 11110010 | 8 |
| 35 | | | | | 11111111011 | 11 | 11110011 | 8 |
| 36 | | | | | 111111111000 | 12 | 11110100 | 8 |
| 37 | | | | | 111111111001 | 12 | 11110101 | 8 |
| 38 | | | | | 111111111010 | 12 | 11110110 | 8 |
| 39 | | | | | 111111111011 | 12 | 11110111 | 8 |
| 40 | | | | | 111111111100 | 12 | 111110000 | 9 |
| 41 | | | | | 111111111101 | 12 | 111110001 | 9 |
| 42 | | | | | 111111111110 | 12 | 111110010 | 9 |
| 43 | | | | | 111111111111,EG0 | 13 | 111110011 | 9 |
| 44 | | | | | | | 111110100 | 9 |
| 45 | | | | | | | 111110101 | 9 |
| 46 | | | | | | | 111110110 | 9 |
| 47 | | | | | | | 111110111 | 9 |
| 48 | | | | | | | 1111110000 | 10 |
| 49 | | | | | | | 1111110001 | 10 |
| 50 | | | | | | | 1111110010 | 10 |
| 51 | | | | | | | 1111110011 | 10 |
| 52 | | | | | | | 1111110100 | 10 |
| 53 | | | | | | | 1111110101 | 10 |
| 54 | | | | | | | 1111110110 | 10 |
| 55 | | | | | | | 1111110111 | 10 |
| 56 | | | | | | | 11111110000 | 11 |
| 57 | | | | | | | 11111110001 | 11 |
| 58 | | | | | | | 11111110010 | 11 |
| 59 | | | | | | | 11111110011 | 11 |
| 60 | | | | | | | 11111110100 | 11 |
| 61 | | | | | | | 11111110101 | 11 |
| 62 | | | | | | | 11111110110 | 11 |
| 63 | | | | | | | 11111110111 | 11 |
| 64 | | | | | | | 11111111000 | 11 |
| 65 | | | | | | | 11111111001 | 11 |
| 66 | | | | | | | 11111111010 | 11 |
| 67 | | | | | | | 11111111011 | 11 |
| 68 | | | | | | | 11111111100 | 11 |
| 69 | | | | | | | 11111111101 | 11 |
| 70 | | | | | | | 11111111110 | 11 |
| 71 | | | | | | | 11111111111,EG0 | 12 |

Table 2

FIG. 13

1504 → Table 3 ← 226

| | coeff_abs_level_minus3[n-1] | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 1 | 2 | 2 | 2 | 2 | 2 | 2 | 3 | 3 | 3 | 3 | 3 |
| | 1 | 1 | 1 | 1 | 1 | 1 | 2 | 2 | 2 | 2 | 2 | 2 | 3 | 3 | 3 | 3 | 3 |
| | 2 | 2 | 2 | 2 | 2 | 2 | 2 | 2 | 2 | 2 | 2 | 2 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

1504 → Table 4 ← 226

| | coeff_abs_level_minus3[n-1] | | | | | | | | | | | | | |
|---|---|---|---|---|---|---|---|---|---|---|---|---|---|---|
| | | 0 | ... | ... | ... | A | ... | ... | ... | B | ... | ... | ... | ≥C | ... | ... |
| Previous cRiceParam | 0 | 0 | 0 | 0 | 0 | 1 | 1 | 1 | 1 | 2 | 2 | 2 | 2 | 3 | 3 | 3 |
| | 1 | 1 | 1 | 1 | 1 | 1 | 1 | 1 | 1 | 2 | 2 | 2 | 2 | 3 | 3 | 3 |
| | 2 | 2 | 2 | 2 | 2 | 2 | 2 | 2 | 2 | 2 | 2 | 2 | 2 | 3 | 3 | 3 |
| | 3 | 3 | 3 | 3 | 3 | 3 | 3 | 3 | 3 | 3 | 3 | 3 | 3 | 3 | 3 | 3 |

230

FIG. 16 cRiceParam = cRiceParam
+ (coeff_abs_level_minus3[n-1] >= A && cRiceParam == 0)  ── 1502
+ (coeff_abs_level_minus3[n-1] >= B && cRiceParam <= 1)  ── 1502
+ (coeff_abs_level_minus3[n-1] >= C && cRiceParam <= 2);  ── 1502

Table 5

| | | coeff_abs_level_minus3[n-1] | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 2 | 2 | 2 | 2 | 2 | 2 | 2 | 2 | 3 | 3 | 3 |
| | 1 | 1 | 1 | 1 | 1 | 2 | 2 | 2 | 2 | 2 | 2 | 2 | 2 | 3 | 3 | 3 |
| | 2 | 2 | 2 | 2 | 2 | 2 | 2 | 2 | 2 | 2 | 2 | 2 | 2 | 3 | 3 | 3 |
| | 3 | 3 | 3 | 3 | 3 | 3 | 3 | 3 | 3 | 3 | 3 | 3 | 3 | 3 | 3 | 3 |

FIG. 18

```
cRiceParam = cRiceParam
            + (coeff_abs_level_minus3[n-1] >= 2  && cRiceParam == 0)
            + (coeff_abs_level_minus3[n-1] >= 4  && cRiceParam <= 1)
            + (coeff_abs_level_minus3[n-1] >= 13 && cRiceParam <= 2);
```

FIG. 19

Table 6

| | | coeff_abs_level_minus3[n-1] | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 2 | 2 | 2 | 2 | 2 | 2 | 2 | 2 | 3 | 3 | 3 | 3 |
| | 1 | 1 | 1 | 1 | 1 | 2 | 2 | 2 | 2 | 2 | 2 | 2 | 2 | 3 | 3 | 3 | 3 |
| | 2 | 2 | 2 | 2 | 2 | 2 | 2 | 2 | 2 | 2 | 2 | 2 | 2 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

FIG. 20

```
cRiceParam = cRiceParam
            + (coeff_abs_level_minus3[n-1] >= 2  && cRiceParam == 0)
            + (coeff_abs_level_minus3[n-1] >= 4  && cRiceParam <= 1)
            + (coeff_abs_level_minus3[n-1] >= 12 && cRiceParam <= 2);
```

FIG. 21

Table 7

| | | \coeff_abs_level_minus3[n-1] | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 2 | 2 | 2 | 2 | 2 | 2 | 2 | 3 | 3 | 3 | 3 | 3 |
| | 1 | 1 | 1 | 1 | 1 | 2 | 2 | 2 | 2 | 2 | 2 | 2 | 3 | 3 | 3 | 3 | 3 |
| | 2 | 2 | 2 | 2 | 2 | 2 | 2 | 2 | 2 | 2 | 2 | 2 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

FIG. 22

```
cRiceParam = cRiceParam
           + (coeff_abs_level_minus3[n-1] >= 2  && cRiceParam == 0)
           + (coeff_abs_level_minus3[n-1] >= 4  && cRiceParam <= 1)
           + (coeff_abs_level_minus3[n-1] >= 11 && cRiceParam <= 2);
```

FIG. 23

Table 8

| | | \coeff_abs_level_minus3[n-1] | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 2 | 2 | 2 | 2 | 2 | 2 | 3 | 3 | 3 | 3 | 3 | 3 |
| | 1 | 1 | 1 | 1 | 1 | 2 | 2 | 2 | 2 | 2 | 2 | 3 | 3 | 3 | 3 | 3 | 3 |
| | 2 | 2 | 2 | 2 | 2 | 2 | 2 | 2 | 2 | 2 | 2 | 3 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

FIG. 24

```
cRiceParam = cRiceParam
           + (coeff_abs_level_minus3[n-1] >= 2  && cRiceParam == 0)
           + (coeff_abs_level_minus3[n-1] >= 4  && cRiceParam <= 1)
           + (coeff_abs_level_minus3[n-1] >= 10 && cRiceParam <= 2);
```

FIG. 25

Table 9

| | M(0) | | | M(1) | | | M(2) | | | M(3) | | | | M(N) | |
|---|---|---|---|---|---|---|---|---|---|---|---|---|---|---|---|
| | 0 | 0 | 0 | ... | 0 | 1 | 1 | ... | 1 | 2 | 2 | ... | 2 | 3 | 3 | ... | ... | N | N |
| | 1 | 1 | 1 | ... | 1 | 1 | 1 | ... | 1 | 2 | 2 | ... | 2 | 3 | 3 | ... | ... | N | N |
| Previous cRiceParam | 2 | 2 | 2 | ... | 2 | 2 | 2 | ... | 2 | 2 | 2 | ... | 2 | 3 | 3 | ... | ... | N | N |
| | 3 | 3 | 3 | ... | 3 | 3 | 3 | ... | 3 | 3 | 3 | ... | 3 | 3 | 3 | ... | ... | N | N |
| | ... | ... | ... | ... | ... | ... | ... | ... | ... | ... | ... | ... | ... | ... | ... | ... | ... | N | N |
| | N | N | N | N | N | N | N | N | N | N | N | N | N | N | N | ... | ... | N | N |

FIG. 26

```
cRiceParam = cRiceParam
           + (coeff_abs_level_minus3[n-1] >= M(1)  &&  cRiceParam == 0)
           + (coeff_abs_level_minus3[n-1] >= M(2)  &&  cRiceParam <= 1)
           + (coeff_abs_level_minus3[n-1] >= M(3)  &&  cRiceParam <= 2)
           ......
           +(coeff_abs_level_minus3[n-1] >= M(N)  &&  cRiceParam <= (N-1)) ;
```

FIG. 27

Table 10

| | coeff_abs_level_minus3[n-1] | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 1 | 2 | 2 | 2 | 2 | 2 | 2 | 2 | 2 | 3 | 3 | 3 |
| | 1 | 1 | 1 | 1 | 1 | 1 | 2 | 2 | 2 | 2 | 2 | 2 | 2 | 2 | 3 | 3 | 3 |
| | 2 | 2 | 2 | 2 | 2 | 2 | 2 | 2 | 2 | 2 | 2 | 2 | 2 | 2 | 3 | 3 | 3 |
| | 3 | 3 | 3 | 3 | 3 | 3 | 3 | 3 | 3 | 3 | 3 | 3 | 3 | 3 | 3 | 3 | 3 |

FIG. 28

```
cRiceParam = cRiceParam
           + (coeff_abs_level_minus3[n-1] >= 2   &&  cRiceParam == 0)
           + (coeff_abs_level_minus3[n-1] >= 5   &&  cRiceParam <= 1)
           + (coeff_abs_level_minus3[n-1] >= 13  &&  cRiceParam <= 2);
```

FIG. 29

Table 11

| Previous cRiceParam | coeff_abs_level_minus3[n-1] | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | ≥15 |
| 0 | 0 | 0 | 1 | 1 | 1 | 2 | 2 | 2 | 2 | 2 | 2 | 2 | 3 | 3 | 3 | 3 |
| 1 | 1 | 1 | 1 | 1 | 1 | 1 | 2 | 2 | 2 | 2 | 2 | 2 | 3 | 3 | 3 | 3 |
| 2 | 2 | 2 | 2 | 2 | 2 | 2 | 2 | 2 | 2 | 2 | 2 | 2 | 3 | 3 | 3 | 3 |
| 3 | 3 | 3 | 3 | 3 | 3 | 3 | 3 | 3 | 3 | 3 | 3 | 3 | 3 | 3 | 3 | 3 |

FIG. 30

```
cRiceParam = cRiceParam
            + (coeff_abs_level_minus3[n-1] >= 2  && cRiceParam == 0)
            + (coeff_abs_level_minus3[n-1] >= 5  && cRiceParam <= 1)
            + (coeff_abs_level_minus3[n-1] >= 12 && cRiceParam <= 2);
```

FIG. 31

Table 12

| Previous cRiceParam | coeff_abs_level_minus3[n-1] | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | ≥15 |
| 0 | 0 | 0 | 1 | 1 | 1 | 2 | 2 | 2 | 2 | 3 | 3 | 3 | 3 | 3 | 3 | 3 |
| 1 | 1 | 1 | 1 | 1 | 1 | 2 | 2 | 2 | 2 | 3 | 3 | 3 | 3 | 3 | 3 | 3 |
| 2 | 2 | 2 | 2 | 2 | 2 | 2 | 2 | 2 | 2 | 3 | 3 | 3 | 3 | 3 | 3 | 3 |
| 3 | 3 | 3 | 3 | 3 | 3 | 3 | 3 | 3 | 3 | 3 | 3 | 3 | 3 | 3 | 3 | 3 |

FIG. 32

```
cRiceParam = cRiceParam
            + (coeff_abs_level_minus3[n-1] >= 2  && cRiceParam == 0)
            + (coeff_abs_level_minus3[n-1] >= 5  && cRiceParam <= 1)
            + (coeff_abs_level_minus3[n-1] >= 10 && cRiceParam <= 2);
```

FIG. 33

Table 13

| | coeff_abs_level_minus3[n-1] | | | | | | | | | |
|---|---|---|---|---|---|---|---|---|---|---|
| | 0 | 1 | 2 | 3 | 4 | 5 | 6 | 7 | 8 | ≥9 |
| Previous cRiceParam 0 | 0 | 0 | 1 | 2 | 2 | 2 | 2 | 2 | 2 | 2 |
| Previous cRiceParam 1 | 1 | 1 | 1 | 2 | 2 | 2 | 2 | 2 | 2 | 2 |
| Previous cRiceParam 2 | 2 | 2 | 2 | 2 | 2 | 2 | 2 | 2 | 2 | 2 |

FIG. 34 cRiceParam = cRiceParam
 + (coeff_abs_level_minus3[n-1] >= 2  &&  cRiceParam == 0)
 + (coeff_abs_level_minus3[n-1] >= 3  &&  cRiceParam <= 1)

FIG. 35

Table 14

| | coeff_abs_level_minus3[n-1] | | | | | | | | | |
|---|---|---|---|---|---|---|---|---|---|---|
| | 0 | 1 | 2 | 3 | 4 | 5 | 6 | 7 | 8 | ≥9 |
| Previous cRiceParam 0 | 0 | 0 | 1 | 1 | 2 | 2 | 2 | 2 | 2 | 2 |
| Previous cRiceParam 1 | 1 | 1 | 1 | 1 | 2 | 2 | 2 | 2 | 2 | 2 |
| Previous cRiceParam 2 | 2 | 2 | 2 | 2 | 2 | 2 | 2 | 2 | 2 | 2 |

FIG. 36 cRiceParam = cRiceParam
 + (coeff_abs_level_minus3[n-1] >= 2  &&  cRiceParam == 0)
 + (coeff_abs_level_minus3[n-1] >= 4  &&  cRiceParam <= 1)

FIG. 37

1504 → Table 15    226 ↗

Table 15

| | coeff_abs_level_minus3[n-1] | | | | | | | | | |
|---|---|---|---|---|---|---|---|---|---|---|
| | 0 | 1 | 2 | 3 | 4 | 5 | 6 | 7 | 8 | ≥9 |
| Previous cRiceParam  0 | 0 | 0 | 1 | 1 | 1 | 2 | 2 | 2 | 2 | 2 |
| 1 | 1 | 1 | 1 | 1 | 1 | 2 | 2 | 2 | 2 | 2 |
| 2 | 2 | 2 | 2 | 2 | 2 | 2 | 2 | 2 | 2 | 2 |

230                           230

FIG. 38 cRiceParam = cRiceParam
  + (coeff_abs_level_minus3[n-1] >= 2 && cRiceParam == 0)   ⟶ 1502
  + (coeff_abs_level_minus3[n-1] >= 5 && cRiceParam <= 1)   ⟶ 1502

1504 → Table 16    226 ↗

Table 16

| | coeff_abs_level_minus3[n-1] | | | | | | | | | |
|---|---|---|---|---|---|---|---|---|---|---|
| | 0 | 1 | 2 | 3 | 4 | 5 | 6 | 7 | 8 | ≥9 |
| Previous cRiceParam  0 | 0 | 0 | 1 | 1 | 1 | 1 | 2 | 2 | 2 | 2 |
| 1 | 1 | 1 | 1 | 1 | 1 | 1 | 2 | 2 | 2 | 2 |
| 2 | 2 | 2 | 2 | 2 | 2 | 2 | 2 | 2 | 2 | 2 |

230                           230

FIG. 40 cRiceParam = cRiceParam
  + (coeff_abs_level_minus3[n-1] >= 2 && cRiceParam == 0)   ⟶ 1502
  + (coeff_abs_level_minus3[n-1] >= 6 && cRiceParam <= 1)   ⟶ 1502

Table 17    226

| | | coeff_abs_level_minus3[n-1] | | | | | | | | |
|---|---|---|---|---|---|---|---|---|---|---|
| | | 0 | 1 | 2 | 3 | 4 | 5 | 6 | 7 | 8 | ≥9 |
| Previous cRiceParam | 0 | 0 | 0 | 1 | 1 | 1 | 1 | 1 | 2 | 2 | 2 |
| | 1 | 1 | 1 | 1 | 1 | 1 | 1 | 1 | 2 | 2 | 2 |
| | 2 | 2 | 2 | 2 | 2 | 2 | 2 | 2 | 2 | 2 | 2 |

230     230

FIG. 42 cRiceParam = cRiceParam
    + (coeff_abs_level_minus3[n-1] >= 2 && cRiceParam == 0)  — 1502
    + (coeff_abs_level_minus3[n-1] >= 7 && cRiceParam <= 1)  — 1502

METHOD OF DETERMINING BINARY CODEWORDS FOR TRANSFORM COEFFICIENTS

CROSS-REFERENCE TO RELATED APPLICATION(S)

This Application claims priority under 35 U.S.C. § 119(e) from earlier filed U.S. application Ser. No. 13/745,508, filed on Jan. 18, 2013 which claims the benefit of U.S. Provisional Application No. 61/589,303, filed Jan. 21, 2012, the entirety of which is hereby incorporated by reference.

TECHNICAL FIELD

The present disclosure relates to the field of video compression, particularly video compression using High Efficiency Video Coding (HEVC) that employ block processing.

BACKGROUND

FIG. 1 depicts a content distribution system 100 comprising a coding system 110 and a decoding system 140 that can be used to transmit and receive HEVC data. In some embodiments, the coding system 110 can comprise an input interface 130, a controller 111, a counter 112, a frame memory 113, an encoding unit 114, a transmitter buffer 115 and an output interface 135. The decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random-access memory and a read only memory.

Source pictures 120 supplied from, by way of a non-limiting example, a content provider can include a video sequence of frames including source pictures in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding units can be derived from the source pictures utilizing the controller 111. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the Coding Units based on a source picture. In response to the encoding control signal 124 from the controller 111, the encoding unit 114 can begin to read out the prepared Coding Units to a high-efficiency encoding process, such as a prediction coding process or a transform coding process which process the prepared Coding Units generating video compression data based on the source pictures associated with the Coding Units.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitted buffer 115 so the counter 112 can be incremented or decremented. The controller 111 can control the production of video packets produced by the encoding unit 114 on the basis of the occupied area information 127 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets 161 from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

In various embodiments, the coding system 110 can be incorporated or otherwise associated with a transcoder or an encoding apparatus at a headend and the decoding system 140 can be incorporated or otherwise associated with a downstream device, such as a mobile device, a set top box or a transcoder.

The coding system 110 and decoding system 140 can be utilized separately or together to encode and decode video data according to various coding formats, including High Efficiency Video Coding (HEVC). HEVC is a block-based hybrid spatial and temporal predictive coding scheme. In HEVC, input images, such as video frames, can be divided into square blocks called Largest Coding Units (LCUs) 200, as shown in FIG. 2. LCUs 200 can each be as large as 128×128 pixels, unlike other coding schemes that break input images into macroblocks of 16×16 pixels. As shown in FIG. 3, each LCU 200 can be partitioned by splitting the LCU 200 into four Coding Units (CUs) 202. CUs 202 can be square blocks each a quarter size of the LCU 200. Each CU 202 can be further split into four smaller CUs 202 each a quarter size of the larger CU 202. By way of a non-limiting example, the CU 202 in the upper right corner of the LCU 200 depicted in FIG. 3 can be divided into four smaller CUs 202. In some embodiments, these smaller CUs 202 can be further split into even smaller sized quarters, and this process of splitting CUs 202 into smaller CUs 202 can be completed multiple times.

With higher and higher video data density, what is needed are further improved ways to code the CUs so that large input images and/or macroblocks can be rapidly, efficiently and accurately encoded and decoded.

SUMMARY

The present invention provides an improved system for HEVC. In embodiments for the system, a method of determining binary codewords for transform coefficients in an efficient manner is provided. Codewords for the transform coefficients within transform units (TUs) that are subdivisions of the CUs 202 are used in encoding input images and/or macroblocks.

An aspect is a method for use in video coding. Video coding may include generating, by a processor, a reconstructed frame by decoding an encoded frame and outputting the reconstructed frame. Decoding the encoded frame may include reading a binary codeword from an encoded bitstream, wherein the binary codeword corresponds to a transform coefficient for a sub-block of a transform unit of the encoded frame, wherein the transform coefficient has a quantized value. Decoding the encoded frame may include identifying a value of a parameter variable. Identifying the value of the parameter value may include, in response to a determination that the transform coefficient is a first transform coefficient for the sub-block, identifying the value of the parameter variable as zero. Identifying the value of the parameter value may include, in response to a determination that the transform coefficient is a transform coefficient for the sub-block other than the first transform coefficient for the sub-block, identifying the value of the parameter variable as an updated parameter variable value, wherein the updated parameter variable value is identified in response to converting an immediately preceding binary codeword into a respective symbol by using, as the updated parameter variable value, a value based at least in part on the value of the parameter variable used for converting the immediately preceding binary codeword and the value of the respective symbol. Decoding the encoded frame may include converting the binary codeword into a symbol based on the value of the parameter variable, wherein the parameter variable is associated with a maximum symbol value that denotes a truncation point for the binary codeword, determining the absolute value of the transform coefficient corresponding to the symbol, wherein the quantized value for the transform coefficient is equal to or greater than a threshold value, by adding the threshold value to the symbol, including the transform coefficient in the sub-block of the transform unit, generating a portion of the reconstructed frame based on the transform unit.

Another aspect is an apparatus for use in video coding. The apparatus comprising a processor configured to generate a reconstructed frame by decoding an encoded frame and output the reconstructed frame. The processor is configured to decode the encoded frame by reading a binary codeword from an encoded bitstream, wherein the binary codeword corresponds to a transform coefficient for a sub-block of a transform unit of the encoded frame, wherein the transform coefficient has a quantized value. The processor is configured to decode the encoded frame by identifying a value of a parameter variable. Identifying the value of the parameter value includes, in response to a determination that the transform coefficient is a first transform coefficient for the sub-block, identifying the value of the parameter variable as zero. Identifying the value of the parameter value includes, in response to a determination that the transform coefficient is a transform coefficient for the sub-block other than the first transform coefficient for the sub-block, identifying the value of the parameter variable as an updated parameter variable value, wherein the updated parameter variable value is identified in response to converting an immediately preceding binary codeword into a respective symbol by using, as the updated parameter variable value, a value based at least in part on the value of the parameter variable used for converting the immediately preceding binary codeword and the value of the respective symbol. The processor is configured to decode the encoded frame by converting the binary codeword into a symbol based on the value of the parameter variable, wherein the parameter variable is associated with a maximum symbol value that denotes a truncation point for the binary codeword, determining the absolute value of the transform coefficient corresponding to the symbol, wherein the quantized value for the transform coefficient is equal to or greater than a threshold value, by adding the threshold value to the symbol, including the transform coefficient in the sub-block of the transform unit, and generating a portion of the reconstructed frame based on the transform unit.

Another aspect is an apparatus for use in video coding. The apparatus comprising a processor configured to generate an encoded frame by encoding an input frame. The processor is configured to encode the input frame by providing a transform unit comprising one or more sub-blocks of the transform coefficients, each of the transform coefficients having a quantized value, determining a symbol for each of the transform coefficients that have a quantized value equal to or greater than a threshold value, by subtracting the threshold value from the absolute value of the transform coefficient, providing a parameter variable, initially setting the parameter variable to a value of zero at each sub-block of the transform unit, converting each symbol into a binary codeword based on the value of the parameter variable, wherein the parameter variable is associated with a maximum symbol value that denotes a truncation point for the binary codeword, including the binary codeword in an output bitstream, and updating the parameter variable after each symbol has been converted by setting the parameter variable to a new value, the new value being based at least in part on the value of the parameter variable preceding the updating and the value of the most recently converted symbol in the sub-block. The processor is configured to transmit or store the output bitstream.

BRIEF DESCRIPTION OF THE DRAWINGS

Further details of the present invention are explained with the help of the attached drawings in which:

FIG. 2 depicts an embodiment of an input image divided into Large Coding Units.

FIG. 3 depicts an embodiment of a Large Coding Unit divided into Coding Units.

FIG. 4 depicts a quadtree representation of a Large Coding Unit divided into Coding Units.

FIG. 5 depicts possible exemplary arrangements of Prediction Units within a Coding Unit.

FIG. 13 depicts an exemplary embodiment of a table for converting symbols into binary codewords based on parameter variables.

FIG. 15 depicts an exemplary embodiment of a low complexity updating table.

FIG. 16 depicts an exemplary embodiment of a low complexity updating table with conditional symbol thresholds of A, B, and C.

FIG. 17 depicts an exemplary embodiment of a combination logic representation of conditions for conditional symbol thresholds of A, B, and C.

FIG. 18 depicts an exemplary embodiment of a low complexity updating table with conditional symbol thresholds of 2, 4, and 13.

FIG. 19 depicts an exemplary embodiment of a combination logic representation of conditions for conditional symbol thresholds of 2, 4, and 13.

FIG. 20 depicts an exemplary embodiment of a low complexity updating table with conditional symbol thresholds of 2, 4, and 12.

FIG. 21 depicts an exemplary embodiment of a combination logic representation of conditions for conditional symbol thresholds of 2, 4, and 12.

FIG. 22 depicts an exemplary embodiment of a low complexity updating table with conditional symbol thresholds of 2, 4, and 11.

FIG. 23 depicts an exemplary embodiment of a combination logic representation of conditions for conditional symbol thresholds of 2, 4, and 11.

FIG. 24 depicts an exemplary embodiment of a low complexity updating table with conditional symbol thresholds of 2, 4, and 10.

FIG. 25 depicts an exemplary embodiment of a combination logic representation of conditions for conditional symbol thresholds of 2, 4, and 10.

FIG. 26 depicts an exemplary embodiment of a combination logic representation of conditions for conditional symbol thresholds ranging from M(0) to M(N).

FIG. 27 depicts an exemplary embodiment of a combination logic representation of conditions for conditional symbol thresholds of ranging from M(1) to M(N).

FIG. 28 depicts an exemplary embodiment of a low complexity updating table with conditional symbol thresholds of 2, 5, and 13.

FIG. 29 depicts an exemplary embodiment of a combination logic representation of conditions for conditional symbol thresholds of 2, 5, and 13.

FIG. 30 depicts an exemplary embodiment of a low complexity updating table with conditional symbol thresholds of 2, 5, and 12.

FIG. 31 depicts an exemplary embodiment of a combination logic representation of conditions for conditional symbol thresholds of 2, 5, and 12.

FIG. 32 depicts an exemplary embodiment of a low complexity updating table with conditional symbol thresholds 2, 5, and 10.

FIG. 33 depicts an exemplary embodiment of a combination logic representation of conditions for conditional symbol thresholds 2, 5, and 10.

FIG. 34 depicts an exemplary embodiment of a low complexity updating table with conditional symbol thresholds of 2 and 3.

FIG. 35 depicts an exemplary embodiment of a combination logic representation of conditions for conditional symbol threshold of 2 and 3.

FIG. 36 depicts an exemplary embodiment of a low complexity updating table with conditional symbol threshold of 2 and 4.

FIG. 37 depicts an exemplary embodiment of a combination logic representation of conditions for conditional symbol threshold of 2 and 4.

FIG. 38 depicts an exemplary embodiment of a low complexity updating table with conditional symbol threshold of 2 and 5.

FIG. 39 depicts an exemplary embodiment of a combination logic representation of conditions for conditional symbol threshold of 2 and 5.

FIG. 40 depicts an exemplary embodiment of a low complexity updating table with conditional symbol threshold of 2 and 6.

FIG. 41 depicts an exemplary embodiment of a combination logic representation of conditions for conditional symbol threshold of 2 and 6.

FIG. 42 depicts an exemplary embodiment of a low complexity updating table with conditional symbol threshold of 2 and 7.

FIG. 43 depicts an exemplary embodiment of a combination logic representation of conditions for conditional symbol threshold of 2 and 7.

DETAILED DESCRIPTION

Figure 1:
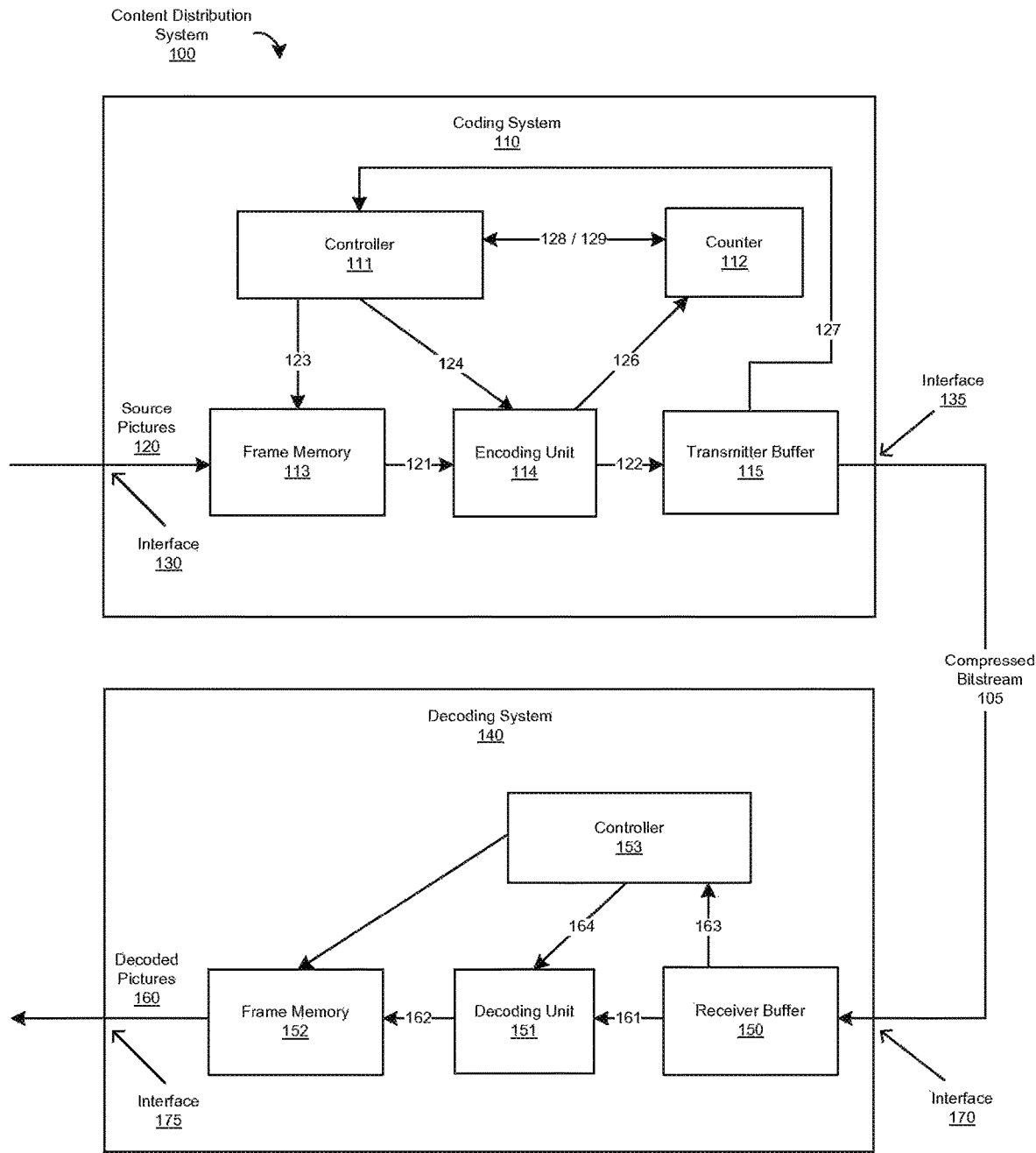
FIG. 1 depicts an embodiment of a content distribution system.

In HEVC, an input image, such as a video frame, is broken up into coding units (CUs) that are then identified in code. The CUs are then further broken into sub-units that are coded as will be described subsequently.

Initially for the coding a quadtree data representation can be used to describe the partition of a large coding unit (LCU) 200. The quadtree representation can have nodes corresponding to the LCU 200 and CUs 202. At each node of the quadtree representation, a flag "1" can be assigned if the LCU 200 or CU 202 is split into four CUs 202. If the node is not split into CUs 202, a flag "0" can be assigned. By way of a non-limiting example, the quadtree representation shown in FIG. 4 can describe the LCU partition shown in FIG. 3, in which the LCU 200 is split into four CUs 202, and the second CU 202 is split into four smaller CUs 202. The binary data representation of the quadtree can be a CU split flag that can be coded and transmitted as overhead, along with other data such as a skip mode flag, merge mode flag, and the PU coding mode described subsequently. By way of a non-limiting example, the CU split flag quadtree representation shown in FIG. 4 can be coded as the binary data representation "10100."

At each leaf of the quadtree, the final CUs 202 can be broken up into one or more blocks called prediction units (PUs) 204. PUs 204 can be square or rectangular. A CU 202 with dimensions of 2N×2N can have one of the four exemplary arrangements of PUs 204 shown in FIG. 5, with PUs 204 having dimensions of 2N×2N, 2N×N, N×2N, or N×N.

A PU can be obtained through spatial or temporal prediction. Temporal prediction is related to inter mode pictures. Spatial prediction relates to intra mode pictures. The PUs 204 of each CU 202 can, thus, be coded in either intra mode or inter mode. Features of coding relating to intra mode and inter mode pictures are described in the paragraphs to follow.

Intra mode coding can use data from the current input image, without referring to other images, to code an I picture. In intra mode the PUs 204 can be spatially predictive coded. Each PU 204 of a CU 202 can have its own spatial prediction direction. Spatial prediction directions can be horizontal, vertical, 45-degree diagonal, 135-degree diagonal, DC, planar, or any other direction. The spatial prediction direction for the PU 204 can be coded as a syntax element. In some embodiments, brightness information (Luma) and color information (Chroma) for the PU 204 can be predicted separately. In some embodiments, the number of Luma intra prediction modes for 4×4, 8×8, 16×16, 32×32, and 64×64 blocks can be 18, 35, 35, 35, and 4 respectively. In alternate embodiments, the number of Luma intra prediction modes for blocks of any size can be 35. An additional mode can be used for the Chroma intra prediction mode. In some embodiments, the Chroma prediction mode can be called "IntraFromLuma."

Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU 204 over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be coded as syntax elements "MV," and the reference pictures can be coded as syntax elements "refIdx." In some embodiments, inter mode coding can allow both spatial and temporal predictive coding.

Figure 6:
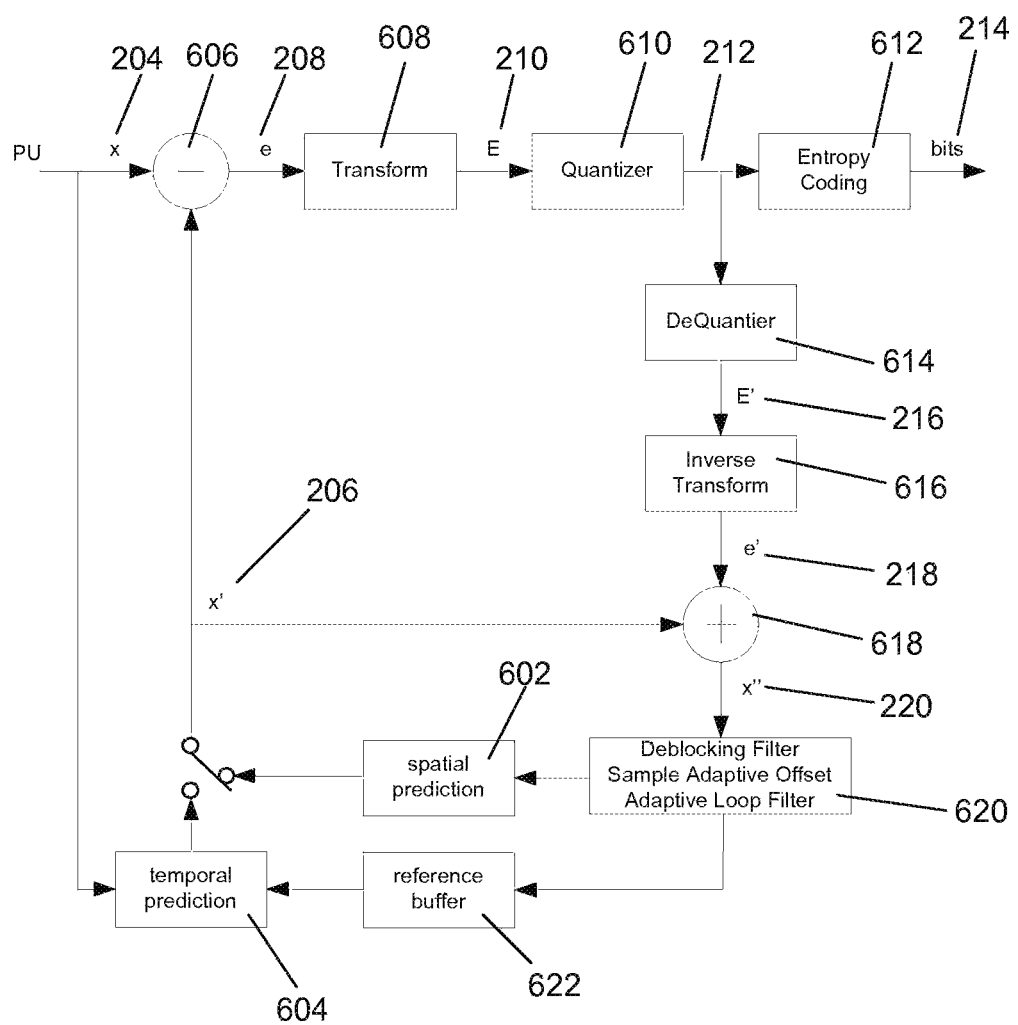
FIG. 6 depicts a block diagram of an embodiment of a method for encoding and/or decoding a Prediction Unit.

FIG. 6 depicts a block diagram of how a PU 204, x, can be encoded and/or decoded. At 606 a predicted PU 206, x', that is predicted by intra mode at 602 or inter mode at 604, as described above, can be subtracted from the current PU 204, x, to obtain a residual PU 208, e. At 608 the residual PU 208, e, can be transformed with a block transform into one or more transform units (TUs) 210, E. Each TU 210 can comprise one or more transform coefficients 212. In some embodiments, the block transform can be square. In alternate embodiments, the block transform can be non-square.

Figure 7:
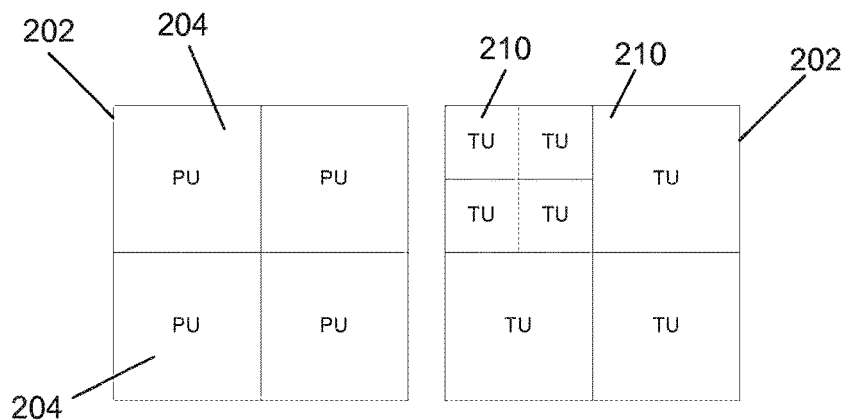
FIG. 7 depicts an exemplary embodiment of a Coding Unit divided into Prediction Units and Transform Units.
Figure 8:
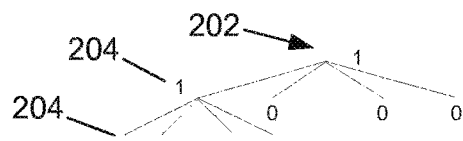
FIG. 8 depicts an exemplary embodiment of a quadtree representation of a Coding Unit divided into Transform Units.

As shown in FIG. 7, in HEVC, a set of block transforms of different sizes can be performed on a CU 202, such that some PUs 204 can be divided into smaller TUs 210 and other PUs 204 can have TUs 210 the same size as the PU 204. Division of CUs 202 and PUs 204 into TUs 210 can be shown by a quadtree representation. By way of a non-limiting example, the quadtree representation shown in FIG. 8 depicts the arrangement of TUs 210 within the CU 202 shown in FIG. 7.

Referring back to FIG. 6, at 610 the transform coefficients 212 of the TU 210, E, can be quantized into one of a finite number of possible values. In some embodiments, this is a lossy operation in which data lost by quantization may not be recoverable. After the transform coefficients 212 have been quantized, at 612 the quantized transform coefficients 212 can be entropy coded, as discussed below, to obtain the final compression bits 214.

At 614 the quantized transform coefficients 212 can be dequantized into dequantized transform coefficients 216 E'. At 616 the dequantized transform coefficients 216 E' can then be inverse transformed to reconstruct the residual PU 218, e'. At 618 the reconstructed residual PU 218, e', can then be added to a corresponding prediction PU 206, x', obtained through either spatial prediction at 602 or temporal prediction at 604, to obtain a reconstructed PU 220, x". At 620 a deblocking filter can be used on reconstructed PUs 220, x", to reduce blocking artifacts. At 620 a sample adaptive offset process is also provided that can be conditionally performed to compensate the pixel value offset between reconstructed pixels and original pixels. Further, at 620, an adaptive loop filter can be conditionally used on the reconstructed PUs 220, x", to reduce or minimize coding distortion between input and output images.

If the reconstructed image is a reference image that will be used for future temporal prediction in inter mode coding, the reconstructed images can be stored in a reference buffer 622. Intra mode coded images can be a possible point where decoding can begin without needing additional reconstructed images.

Figure 9:
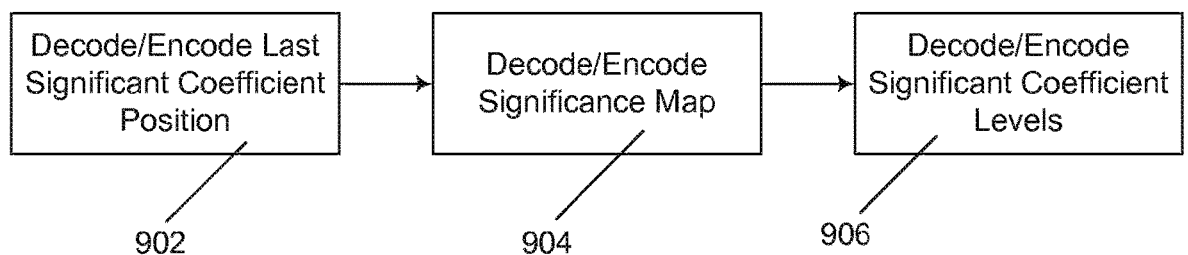
FIG. 9 depicts an embodiment of a method of performing context-based adaptive binary arithmetic coding for transform coefficient encoding/decoding.
Figure 10:
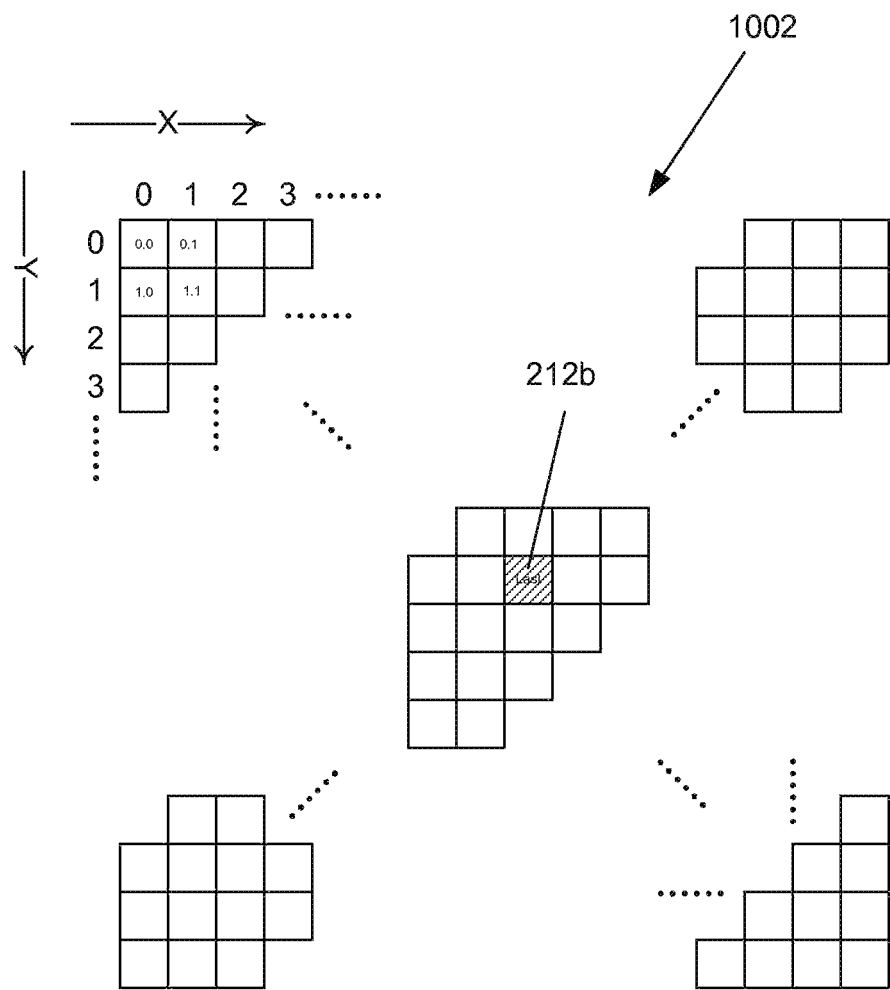
FIG. 10 depicts an exemplary embodiment of a significance map.

HEVC can use entropy coding schemes during step 612 such as context-based adaptive binary arithmetic coding (CABAC). The coding process for CABAC is shown in FIG. 9. At 902, the position of the last significant transform coefficient of the transform units 210 can be coded. Referring back to FIG. 6, the quantized transform coefficients are created by quantizing the TUs 210. Transform coefficients 212 can be significant or insignificant. FIG. 10 shows a significance map 1002 of the transform coefficients 212. Insignificant transform coefficients 212 can have a quantized value of zero, while significant transform coefficients 212 can have a quantized value that is a positive or negative non-zero value. In some embodiments, significant transform coefficients 212 can also be known as non-zero quantized transform coefficients 212. If a TU 210 comprises one or more significant transform coefficients 212, the coordinates of the last significant transform coefficient 212 along a forward zig-zag coding scan from the top left corner of the TU 210 to the lower right corner of the TU 210, as shown in FIG. 10, can be coded. In alternate embodiments, the significant transform coefficients 212 can be scanned along an inverse wavefront scan, inverse horizontal scan, inverse vertical scan, or any other scan order. In some embodiments, these coordinates can be coded as the syntax elements "last_significant_coeff_y" and "last_significant_coeff_x." By way of a non-limiting example, FIG. 10 depicts the position of the last significant transform 212 b within a TU 210 which is being coded in block 902 of FIG. 9.

At block 904 in FIG. 9, the significance map 1002 can be coded to indicate the positions of each of the significant transform coefficients 212 in the TU 210. A significance map 1002 can comprise a binary element for each position in the TU 210. The binary element can be coded as "0" to indicate that the transform coefficient 212 at that position is not significant. The binary element can be coded as "1" to indicate that the transform coefficient 212 at that position is significant.

The quantized transform coefficients 212 of the TUs 210 can be divided into groups. In some embodiments, the groups can be sub-blocks. Sub-blocks can be square blocks of 16 quantized transform coefficients 212. In other embodiments, the groups can be subsets. Subsets can comprise 16 quantized transform coefficients 212 that are consecutive along a backwards zig-zag scan. In alternate embodiments, groups can comprise any number of quantized transform coefficients 212 from a TU 210 in any scan order and/or shape.

Figures 11, 12:
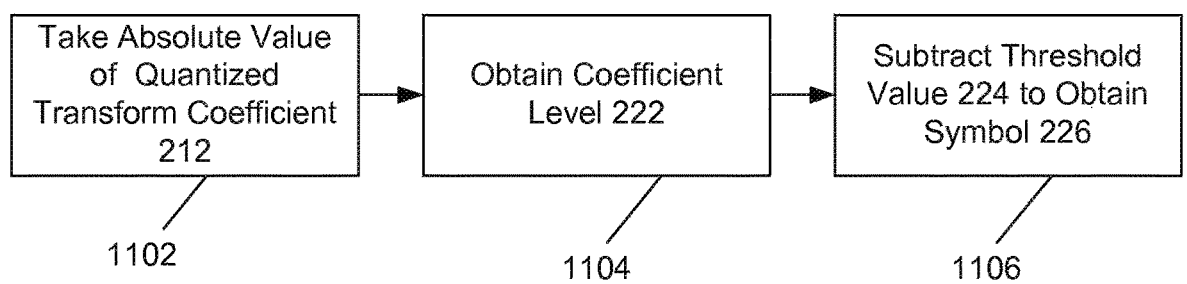
FIG. 11 depicts an embodiment of a method of obtaining coefficient levels and symbols for transform coefficients.
FIG. 12 depicts exemplary embodiments of maximum symbol values for associated parameter variables.

Referring back to FIG. 9 in the last block 906, each quantized transform coefficient 212 in each group within the TU 210 can be coded into binary values to obtain final compression bits 214 shown in FIG. 6, including coding for significant coefficient levels. The absolute value of each quantized transform coefficient 212 can be coded separately from the sign of the quantized transform coefficient 212. FIG. 11 illustrates coding steps that deal with taking an absolute value of the quantized transform coefficients. As shown in FIG. 11, at 1102 the absolute value of each quantized transform coefficient 212 can be taken to enable obtaining the coefficient level 222 for that quantized transform coefficient 212 at block 1104. In some embodiments, the positive or negative sign of non-zero coefficient levels 222 can be coded separately.

The coefficient levels 222 obtained at block 1104 that are expected to occur with a higher frequency can be coded before coefficient levels 222 that are expected to occur with lower frequencies. By way of a non-limiting example, in some embodiments coefficient levels 222 of 0, 1, or 2 can be expected to occur most frequently. Coding the coefficient levels 222 in three parts can identify the most frequently occurring coefficient levels 222, leaving more complex calculations for the coefficient levels 222 that can be expected to occur less frequently. In some embodiments, this can be done by coding the coefficient levels 222 in three parts. First, the coefficient level 222 of a quantized transform coefficient 212 can be checked to determine whether it is greater than one. If the coefficient level 222 is greater than one, the coefficient level 222 can be checked to determine whether it is greater than two.

At 1106 in FIG. 11, if the coefficient level 222 is greater than two, the coefficient level 222 can be subtracted by a threshold value 224 of three to obtain a symbol 226. By way of a non-limiting example, in some embodiments, the coefficient level 222 can be coded as three variables: "coeff_abs_level_greater1_flag," "coeff_abs_level_greater2_flag," and "coeff_abs_level_minus3." For quantized transform coefficients 212 with a coefficient level 222 of two or more, "coeff_abs_level_greater1_flag" can be set to "1." If "coeff_abs_level_greater1_flag" is set to "1" and the quantized transform coefficient 212 also has a coefficient level 222 of three or more, "coeff_abs_level_greater2_flag" can be set to "1." If "coeff_abs_level_greater2_flag" is set to "1," the threshold value 224 of three can be subtracted from the coefficient level 222 to get the quantized transform coefficient's symbol 226, coded as "coeff_abs_level_minus3." In alternate embodiments, the coefficient level 222 can be coded in a different number of parts, and/or the threshold value 224 can be an integer other than three.

For the quantized transform coefficients 212 that occur less frequently and have coefficient levels 222 of three or more as determined in the blocks of FIG. 11, the quantized transform coefficient's symbol 226 can be converted to a binary codeword 228 that can be part of the final compression bits 214 generated as shown in FIG. 6. The conversion to a binary codeword 228 can be performed with Truncated Rice code alone, or with a combination of Truncated Rice code and exponential-Golomb (Exp-Golomb) code. The Truncated Rice code can obtain a binary codeword 228 based a parameter variable 230 and the symbol 226. Each symbol 226 can be coded by scanning through each sub-block, subset, or other group within a TU and converting each symbol 226 of the group in order according to the value of the parameter variable 230, and then moving to the symbols 226 of the next group. In some embodiments, the current scanning position can be denoted by "n."

Referring to FIGS. 12 and 13, the parameter variable 230 can be a global variable that can be updated as each symbol 226 is coded. The parameter variable 230 can control the flatness of the codeword distribution. In some embodiments, the parameter variable 230 can be any integer between 0 and N. By way of a non-limiting example, in some embodiments N can be 3, such that the parameter variable 230 can be 0, 1, 2, or 3. In some embodiments, the parameter variable 230 can be denoted as "cRiceParam" as illustrated in FIG. 12 as well as FIG. 13.

Referring still to FIG. 12, each parameter variable 230 can have an associated maximum symbol value 232 that denotes the truncation point for the Truncated Rice code. In some embodiments, the maximum symbol value 232 for a particular parameter variable 230 can be denoted as "cTRMax" 232, as illustrated in FIG. 12 which depicts an exemplary table of maximum symbol values 232 "cTRMax" for each value of the parameter variable 230 "cRiceParam." The table of FIG. 12 is labeled as Table 1, as it provides a first listing of values for the cRiceParam parameter variable 230 relative to the cTRMax maximum value symbols 232. If the symbol 226 is less than or equal to the maximum symbol value 232 for the parameter variable 230, the symbol 226 can be converted into a binary codeword 228 using only Truncated Rice code. If the symbol 226 is greater than the maximum symbol value 232 for the parameter variable 230, the binary codeword 228 can be generated using a combination of the Truncated Rice code and Exp-Golomb code, with the Truncated Rice codeword for the maximum symbol value 232 being concatenated with the Exp-Golomb code for the symbol 226 minus the maximum symbol value 232 minus one. By way of a non-limiting example, FIG. 13 depicts an exemplary table of binary codewords 228 generated based on symbols 226 and parameter variables 230. Since FIG. 13 provides a second table listing cRiceParam parameter variables 230 relative to other values, it is labeled as Table 2.

In some situations and/or embodiments, converting the symbol 226 according to Truncated Rice code with a lower value for the parameter variable 230 can result in a binary codeword 228 having fewer bits than converting the same symbol 226 according to Truncated Rice code with a higher value for the parameter variable 230. By way of a non-limiting example, as shown by the table depicted in FIG. 13, using a parameter variable 230 value of 0 to convert a symbol 226 of 0 can result in the binary codeword 228 of "0" having 1 bit, while using the parameter variable 230 value of 1 to convert the symbol 226 of 0 can result in the binary codeword 228 of "00" having 2 bits.

In other situations and/or embodiments, converting the symbol 226 according to Truncated Rice code with a higher value for the parameter variable 230 can result in a binary codeword 228 having fewer bits than converting the same symbol 226 according to Truncated Rice code with a lower value for the parameter variable 230. By way of a non-limiting example, as shown in the table depicted in FIG. 13, using a parameter variable 230 value of 0 to convert a symbol 226 of 6 can result in the binary codeword 228 of "1111110" having 7 bits, while using the parameter variable 230 value of 2 to convert the symbol 226 of 6 can result in the binary codeword 228 of "1010" having 4 bits.

Generally referring to FIG. 13, Truncated Rice code with a smaller cRiceParam parameter value 230 can be preferred to code the symbols with smaller codewords, as they need fewer bits to represent. For example, if a symbol 226 has a value of 0, using Truncated Rice code with a cRiceParam parameter value 230 equal to 0, only 1 bit is needed, but 2, 3, or 4 bits are needed when the cRiceParam value is 1, 2, or 3, respectively. If a symbol has a value of 6, using Truncated Rice code with a cRiceParam value equal to 0, 7 bits are needed. But 5, 4, or 4 bits are needed when the cRiceParam value is 1, 2, or 3, respectively.

Figure 14:
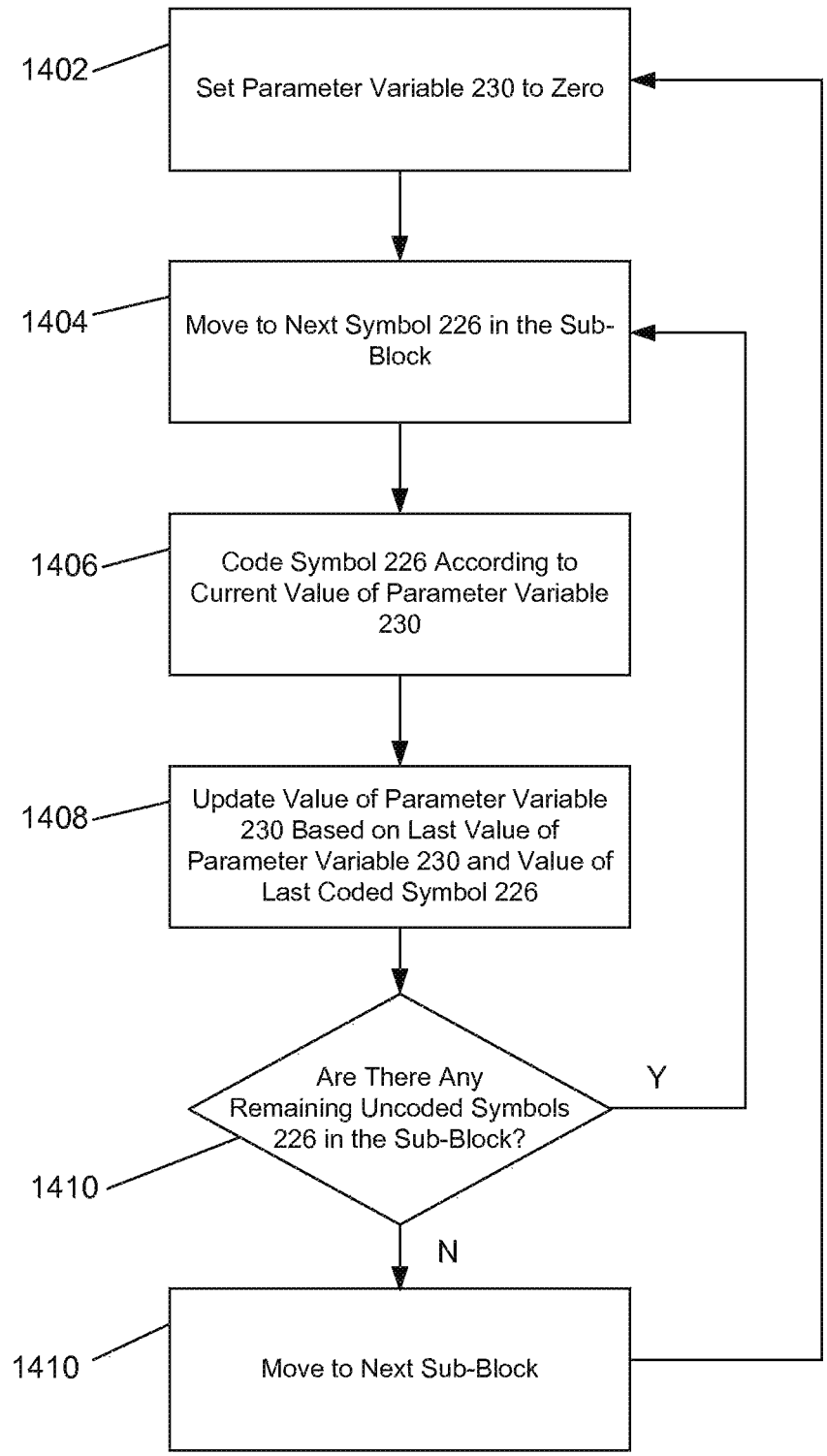
FIG. 14 depicts a flowchart for a method for coding symbols and updating parameter variables.

FIG. 14 is a flow chart depicting a method for entropy coding the symbols 226. At 1402, for each TU 210, the parameter variable 230 can be initially set to a value of zero. At 1404 the coding system 110 can move to the next symbol 226. In some situations and/or embodiments, the next symbol 226 can be the first symbol 226 in the first sub-block. At 1406, the symbol 226 can be coded with Truncated Rice and/or Exp-Golomb code using the current value of the parameter variable 230. At 1408, the value of the parameter variable 230 can be updated based on the last value of the parameter variable 230 and the value of the last symbol 226 that was coded. In some situations and/or embodiments, the updated value of the parameter variable 230 can be the same as the last value of the parameter variable 230. In other situations and/or embodiments, the updated value of the parameter variable 230 can be greater than the last value of the parameter variable 230. The parameter variable 230 can be updated based upon calculations or upon values derived from a table as described herein subsequently.

At 1410, after the parameter variable 230 has been updated at 1408, if any symbols 226 remain uncoded in the sub-block, the coding system 110 can return to 1404 and move to the next symbol 226 in the sub-block. The next symbol 226 can then be coded at 1406 using the updated value of the parameter variable 230 and the process can repeat for all remaining symbols 226 in the sub-block. If no symbols 226 remain uncoded in the sub-block at 1410, the coding system 110 can move to the next sub-block at 1412, return to 1402 and reset the parameter variable 230 to zero, and repeat the process to code the symbols 226 in the next sub-block. The parameter variable cRiceParam 230 can be reset once per sub-block with initial "0" values. For a TU with more than one sub-block of 16 quantized transform coefficients 212, the cRiceParam parameter variable 230 for coeff_abs_level_minus3 symbols 226 can be reset to 0 for each sub-block, which can favor smaller symbol value coding.

Referring to FIG. 15 and subsequent figures, the cRiceParam parameter variable 230 can be derived and updated based on a table 1504 as follows. In some embodiments, the parameter variable 230 can be updated by performing a table lookup from a low complexity update table 1504 based on the last value of the parameter variable 230 and the value of the last coded symbol 226. For a TU sub-block, the cRiceParam 230 can be initially set to 0, and can be updated for each symbol 226 in the sub-block based on the previous value of the parameter variable 230 "cRiceParam" and the value of the symbol 226 "coeff_abs_level_minus3[n−1]" according a table, for example the table shown in FIG. 15. Because FIG. 15 shows a third table listing symbol values 226 relative to cRiceParam parameter values 230, the table is labeled as Table 3. Subsequent tables showing a similar comparison will, likewise, be labeled consecutively.

In some embodiments, conditional symbol thresholds can be set as the variables A, B, and/or C. The values of A, B, and C can be set to any desired values. The cRiceParam parameter variable 230 can be set depending on the value of the coeff_abs_level_minus3[n−1] symbol 226 compared with the conditional symbol thresholds as follows: (1) the parameter variable 230 can remain the same when the value of the last coded symbol 226 is between 0 and A−1; (2) the parameter variable 230 can be set to one or remain at the last value of the parameter variable 230, whichever is greater, when the symbol 226 is between A and B−1; (3) the parameter variable 230 can be set to two or remain at the last value of the parameter variable 230, whichever is greater, when the symbol 226 is between B and C−1; or (4) the parameter variable 230 can be set to three when the symbol 226 is greater than C−1. An example of a general low complexity update table 1504, labeled Table 4, for these conditions 1502 is depicted in FIG. 16. In this exemplary embodiment, A, B, or C can be the conditional symbol thresholds respectively, and the value of 0, 1, or 2 can be the parameter variables 230 respectively.

In some embodiments, referring back to FIG. 14, the updating of the parameter variable 230 at 1408 can be determined from a comparison equation rather than looking up the new value for the parameter variable 230 from a table such as Table 4. In the comparison equation, it can be determined whether both the last value of the parameter variable 230 and the value of the last coded symbol 226 meet one or more conditions 1502, as illustrated in FIG. 17. In some embodiments, the value of the last coded symbol 226 can be denoted as "coeff_abs_level_minus3[n−1]" as it was in Table 3. The parameter variable 230 can be updated depending on which conditions are met, and the value of the current symbol 226 can then be coded based on the updated parameter variable 230 using Truncated Rice code and/or Exp-Golomb Code.

In some embodiments, each condition 1502 can comprise two parts, a conditional symbol threshold and a conditional parameter threshold. In these embodiments, the condition 1502 can be met if the value of the symbol 226 is equal to or greater than the conditional symbol threshold and the parameter variable 230 is equal to or greater than the conditional parameter threshold. In alternate embodiments, each condition 1502 can have any number of parts or have any type of condition for either or both the symbol 226 and parameter variable 230. In some embodiments, the parameter variable 230 can be incremented by one for each condition 1502 that is met. By way of a non-limiting example, an integer of one can be mathematically added to the previous value of the parameter variable 230 for each condition that is satisfied.

Because an updating table, such as Table 3 shown in FIG. 15, can need memory space to store and fetch its data and can require processor cycles to access and use, combination logic such as the comparison equation of FIG. 17 can be used perform the comparison in place of an updating table, as in some embodiments the combination logic can use fewer processor cycles and/or take less memory space. An example of the combination logic representation that determines the updated cRiceParam parameter variable 230 in the place of Table 4 is shown in FIG. 17.

A selection of non-limiting examples of update tables 1504 and their associated combination logic representations 1506 with particular values of A, B, and C, are depicted in FIGS. 18-25. FIGS. 18 and 19 respectively depict an update table (Table 5) and combination logic representation for conditional symbol thresholds 2, 4, and 13. FIGS. 20 and 21 respectively depict an update table (Table 6) and combination logic representation for conditional symbol thresholds 2, 4, and 12. FIGS. 22 and 23 respectively depict an update table (Table 7) and combination logic representation for conditional symbol thresholds 2, 4, and 11. FIGS. 24 and 25 respectively depict an update table (Table 8) and combination logic representation for conditional symbol thresholds 2, 4, and 10.

Referring to FIG. 26 and subsequent figures, in other embodiments an updating table 1504 or combination logic representation 1506 can be set with any number of conditional symbol thresholds and any number of parameter symbol thresholds, with possible values of the cRiceParam parameter variables 230 ranging from 0 to N. Each conditional symbol threshold can be expressed as M(j), with j being an integer between 0 and N−1, or M(N). There can be a plurality of conditional thresholds ranging from M(0) to M(N). By way of a non-limiting example, the values of the conditional symbol thresholds can increase as j increases toward N, such that M(0)<M(1)<M(2)< ... <M(N). For each value of j, when the symbol 226 is equal to M(j) or is between M(j) and M(j+1), the parameter variable can be set to the value of j or remain at the last value of the parameter variable 230, whichever is greater. When the symbol is equal to or greater than M(N), the parameter variable can be set to the value of N. A low complexity update table 1504 for these conditions 1502 is depicted in FIG. 26, and a combination logic representation 1506 for these conditions 1502 is depicted in FIG. 27.

A selection of non-limiting examples of update tables 1504 and their associated combination logic representations 1506 with particular values of the conditional symbol thresholds M(j) to M(N) and parameter variable thresholds are depicted in FIGS. 28-43. FIGS. 28 and 29 respectively depict an update table 1504 and combination logic representation for conditional symbol thresholds 2, 5, and 13. FIGS. 30 and 31 respectively depict an update table 1504 and combination logic representation for conditional symbol thresholds 2, 5, and 12. FIGS. 32 and 33 respectively depict an update table 1504 and combination logic representation for conditional symbol thresholds 2, 5, and 10.

As an illustration that any number of parameter variables 230 and conditional symbol thresholds can be used, FIGS. 32-43 depict exemplary embodiments of update tables 1504 and combination logic representations 1506 in which the cRiceParam parameter variables 230 are 0, 1, or 2, and the coeff_abs_level_minus3[n−1] symbols 226 range from 0 to 9 or more. FIGS. 34 and 35 respectively depict an update table 1504 and combination logic representation for conditional symbol threshold of 2 and 3. FIGS. 36 and 37 respectively depict an update table 1504 and combination logic representation for conditional symbol threshold of 2 and 4. FIGS. 38 and 39 respectively depict an update table 1504 and combination logic representation for conditional symbol threshold of 2 and 5. FIGS. 40 and 41 respectively depict an update table 1504 and combination logic representation for conditional symbol threshold of 2 and 6. FIGS. 42 and 43 respectively depict an update table 1504 and combination logic representation for conditional symbol threshold of 2 and 7.

Figure 44:
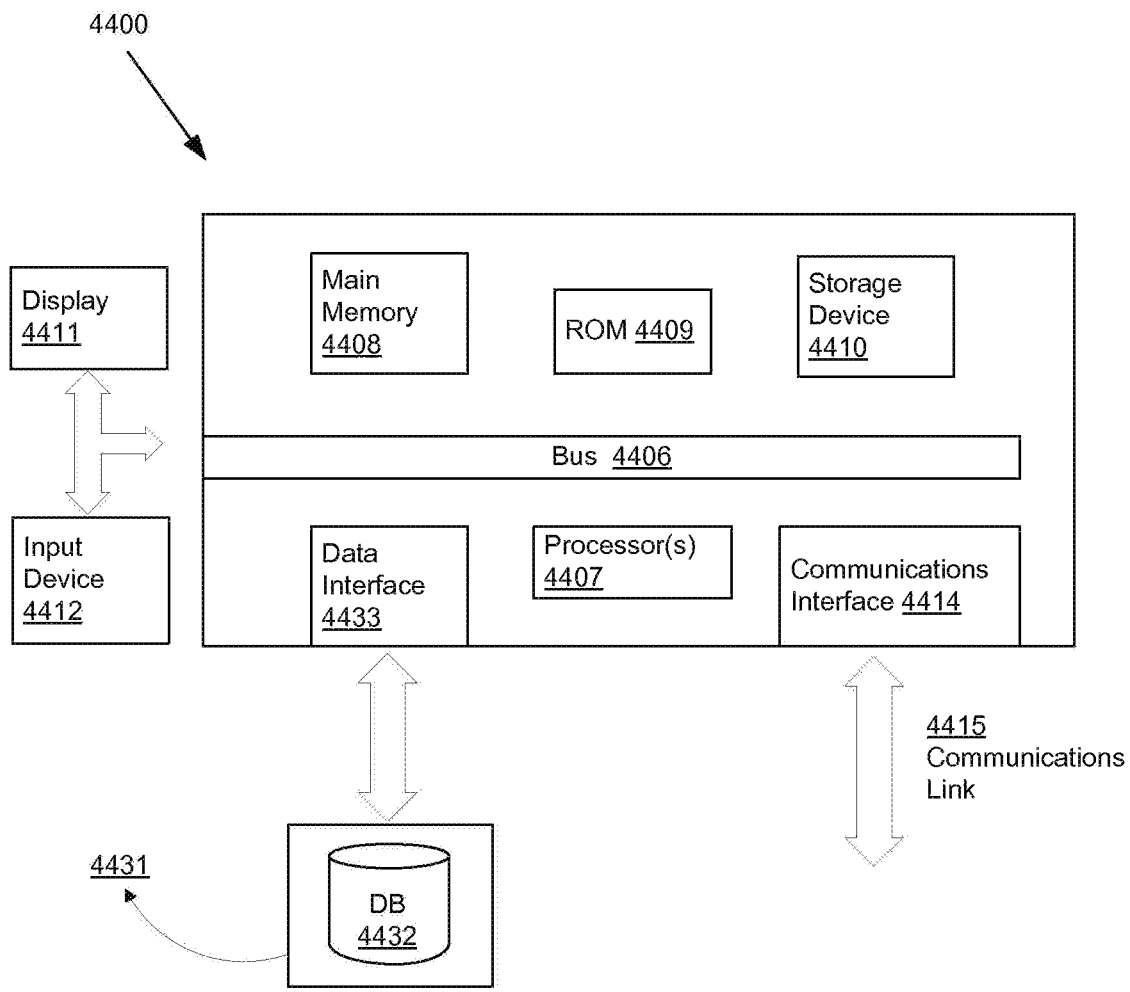
FIG. 44 depicts an exemplary embodiment of computer hardware.

The execution of the sequences of instructions required to practice the embodiments may be performed by a computer system 4400 as shown in FIG. 44. In an embodiment, execution of the sequences of instructions is performed by a single computer system 4400. According to other embodiments, two or more computer systems 4400 coupled by a communication link 4415 may perform the sequence of instructions in coordination with one another. Although a description of only one computer system 4400 may be presented herein, it should be understood that any number of computer systems 4400 may be employed.

A computer system 4400 according to an embodiment will now be described with reference to FIG. 44, which is a block diagram of the functional components of a computer system 4400. As used herein, the term computer system 4400 is broadly used to describe any computing device that can store and independently run one or more programs.

The computer system 4400 may include a communication interface 4414 coupled to the bus 4406. The communication interface 4414 provides two-way communication between computer systems 4400. The communication interface 4414 of a respective computer system 4400 transmits and receives electrical, electromagnetic or optical signals, that include data streams representing various types of signal information, e.g., instructions, messages and data. A communication link 4415 links one computer system 4400 with another computer system 4400. For example, the communication link 4415 may be a LAN, an integrated services digital network (ISDN) card, a modem, or the Internet.

A computer system 4400 may transmit and receive messages, data, and instructions, including programs, i.e., application, code, through its respective communication link 4415 and communication interface 4414. Received program code may be executed by the respective processor(s) 4407 as it is received, and/or stored in the storage device 4410, or other associated non-volatile media, for later execution.

In an embodiment, the computer system 4400 operates in conjunction with a data storage system 4431, e.g., a data storage system 4431 that contains a database 4432 that is readily accessible by the computer system 4400. The computer system 4400 communicates with the data storage system 4431 through a data interface 4433.

Computer system 4400 can include a bus 4406 or other communication mechanism for communicating the instructions, messages and data, collectively, information, and one or more processors 4407 coupled with the bus 4406 for processing information. Computer system 4400 also includes a main memory 4408, such as a random-access memory (RAM) or other dynamic storage device, coupled to the bus 4406 for storing dynamic data and instructions to be executed by the processor(s) 4407. The computer system 4400 may further include a read only memory (ROM) 4409 or other static storage device coupled to the bus 4406 for storing static data and instructions for the processor(s) 4407. A storage device 4410, such as a magnetic disk or optical disk, may also be provided and coupled to the bus 4406 for storing data and instructions for the processor(s) 4407.

A computer system 4400 may be coupled via the bus 4406 to a display device 4411, such as an LCD screen. An input device 4412, e.g., alphanumeric and other keys, is coupled to the bus 4406 for communicating information and command selections to the processor(s) 4407.

According to one embodiment, an individual computer system 4400 performs specific operations by their respective processor(s) 4407 executing one or more sequences of one or more instructions contained in the main memory 4408. Such instructions may be read into the main memory 4408 from another computer-usable medium, such as the ROM 4409 or the storage device 4410. Execution of the sequences of instructions contained in the main memory 4408 causes the processor(s) 4407 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for use in video coding, the method comprising:
   generating, by a processor, a reconstructed frame by decoding an encoded frame, wherein decoding the encoded frame includes:
      reading a binary codeword from an encoded bitstream, wherein the binary codeword corresponds to a transform coefficient for a sub-block of a transform unit of the encoded frame, wherein the transform coefficient has a quantized value;
      identifying a value of a parameter variable, wherein identifying the value of the parameter value includes:
         in response to a determination that the transform coefficient is a first transform coefficient for the sub-block, identifying the value of the parameter variable as zero; and
         in response to a determination that the transform coefficient is a transform coefficient for the sub-block other than the first transform coefficient for the sub-block, identifying the value of the parameter variable as an updated parameter variable value, wherein the updated parameter variable value is identified in response to converting an immediately preceding binary codeword into a respective symbol by using, as the updated parameter variable value, a value based at least in part on the value of the parameter variable used for converting the immediately preceding binary codeword and the value of the respective symbol;
      converting the binary codeword into a symbol based on the value of the parameter variable, wherein the parameter variable is associated with a maximum symbol value that denotes a truncation point for the binary codeword;
      determining the absolute value of the transform coefficient corresponding to the symbol, wherein the quantized value for the transform coefficient is equal to or greater than a threshold value, by adding the threshold value to the symbol,
      including the transform coefficient in the sub-block of the transform unit; and
      generating a portion of the reconstructed frame based on the transform unit; and
   outputting the reconstructed frame.

2. The method of claim 1, wherein converting the binary codeword includes looking up the symbol from a table based on the value of the binary codeword and the value of the parameter variable.

3. The method of claim 1, wherein using, as the updated parameter variable value, the value based at least in part on the value of the parameter variable used for converting the immediately preceding binary codeword and the value of the respective symbol comprises:
   looking up the value from a table based on the value of the parameter variable used for converting the immediately preceding binary codeword and the value of the respective symbol.

4. The method of claim 1, wherein the threshold value is three.

5. The method of claim 1, wherein the value of the parameter variable is configured to be zero, one, two, or three.

6. The method of claim 1, wherein the value of the parameter variable is configured to be zero or any integer between zero and a designated upper limit value.

7. The method of claim 1, wherein the transform unit is a subdivision of a coding unit in a High Efficiency Video Coding signal.

8. An apparatus for use in video coding, the apparatus comprising:
   a processor configured to:
      generate a reconstructed frame by decoding an encoded frame, wherein the processor is configured to decode the encoded frame by:
         reading a binary codeword from an encoded bitstream, wherein the binary codeword corresponds to a transform coefficient for a sub-block of a transform unit of the encoded frame, wherein the transform coefficient has a quantized value;
         identifying a value of a parameter variable, wherein identifying the value of the parameter value includes:

in response to a determination that the transform coefficient is a first transform coefficient for the sub-block, identifying the value of the parameter variable as zero; and in response to a determination that the transform coefficient is a transform coefficient for the sub-block other than the first transform coefficient for the sub-block, identifying the value of the parameter variable as an updated parameter variable value, wherein the updated parameter variable value is identified in response to converting an immediately preceding binary codeword into a respective symbol by using, as the updated parameter variable value, a value based at least in part on the value of the parameter variable used for converting the immediately preceding binary codeword and the value of the respective symbol;

converting the binary codeword into a symbol based on the value of the parameter variable, wherein the parameter variable is associated with a maximum symbol value that denotes a truncation point for the binary codeword;

determining the absolute value of the transform coefficient corresponding to the symbol, wherein the quantized value for the transform coefficient is equal to or greater than a threshold value, by adding the threshold value to the symbol;

including the transform coefficient in the sub-block of the transform unit; and generating a portion of the reconstructed frame based on the transform unit; and output the reconstructed frame.

9. The apparatus of claim 8, wherein converting the binary codeword includes looking up the symbol from a table based on the value of the binary codeword and the value of the parameter variable.

10. The apparatus of claim 8, wherein using, as the updated parameter variable value, the value based at least in part on the value of the parameter variable used for converting the immediately preceding binary codeword and the value of the respective symbol comprises:

looking up the value from a table based on the value of the parameter variable used for converting the immediately preceding binary codeword and the value of the respective symbol.

11. The apparatus of claim 8 wherein the threshold value is three.

12. The apparatus of claim 8, wherein the value of the parameter variable is configured to be zero, one, two, or three.

13. The apparatus of claim 8, wherein the value of the parameter variable is configured to be zero or any integer between zero and a designated upper limit value.

14. The apparatus of claim 8, wherein the transform unit is a subdivision of a coding unit in a High Efficiency Video Coding signal.

\* \* \* \* \*